United States Patent
Soderlindh

(10) Patent No.: US 7,177,080 B2
(45) Date of Patent: Feb. 13, 2007

(54) METHOD AND A DEVICE FOR BI-MONOCULAR IMAGE TRANSFER

(75) Inventor: Michel Soderlindh, Stockholm (SE)

(73) Assignee: Flir Systems AB (SE)

( * ) Notice: Subject to any disclaimer, the term of this patent is extended or adjusted under 35 U.S.C. 154(b) by 0 days.

(21) Appl. No.: 10/934,356

(22) Filed: Sep. 7, 2004

(65) Prior Publication Data
US 2005/0046940 A1    Mar. 3, 2005

Related U.S. Application Data

(63) Continuation of application No. PCT/SE03/00333, filed on Mar. 3, 2003.

(30) Foreign Application Priority Data
Mar. 7, 2002    (SE) ................................. 0200672

(51) Int. Cl.
*G02B 27/00*    (2006.01)
(52) U.S. Cl. ................ 359/480; 359/629; 359/472; 359/477; 349/11
(58) Field of Classification Search ................ 359/363, 359/400, 404, 629–630, 480–482, 466, 472, 359/475, 477; 348/79; 349/5, 8, 9, 11; 345/7–9
See application file for complete search history.

(56) References Cited

U.S. PATENT DOCUMENTS

| | | | | |
|---|---|---|---|---|
| 3,829,194 A | * | 8/1974 | Van Exel et al. ........... | 359/417 |
| 4,205,894 A | | 6/1980 | Filipovich et al. | |
| 5,235,444 A | * | 8/1993 | de Vaan ........................ | 349/9 |
| 5,428,469 A | * | 6/1995 | Willett ........................... | 349/9 |
| 5,467,205 A | * | 11/1995 | Kuba et al. ..................... | 349/5 |

(Continued)

FOREIGN PATENT DOCUMENTS

EP    0 838 708 A1    4/1998

(Continued)

OTHER PUBLICATIONS

U.S. Government Printing Office, Military Handbook 141 (MIL-HDBK-141), "Mirror and Prism Systems", Section 13.10.21, "Carl Zeiss Binocular-Ocular Prism System", p. 13-45, 1973.

*Primary Examiner*—Mark A. Robinson
*Assistant Examiner*—Lee Fineman
(74) *Attorney, Agent, or Firm*—Connolly Bove Lodge & Hutz, LLP; Larry J. Hume

(57) ABSTRACT

A viewing arrangement includes an image generator having a single, two-sided display screen having a front and a back side which display a front image and a back image, respectively, of a translucent or transparent image generated by the image generator; two eyepieces suitable for viewing the front and back images via respective eyes of a person using the arrangement; and an optical imaging system which images and transmits the front image to one eye of the person using the arrangement via the first eyepiece, and the back image to another eye of the person using the arrangement via the second eyepiece. A corresponding method includes generating an image; processing the image with an optical imaging system into front and back images; displaying the front and back images on a two-sided display; and transmitting the front and back images to first and second eyepieces.

19 Claims, 3 Drawing Sheets

U.S. PATENT DOCUMENTS

| | | | |
|---|---|---|---|
| 5,579,165 A | 11/1996 | Michel et al. | |
| 5,642,221 A * | 6/1997 | Fischer et al. | 359/477 |
| 5,712,649 A * | 1/1998 | Tosaki | 345/8 |
| 6,008,939 A * | 12/1999 | Hebert | 359/475 |
| 6,100,943 A * | 8/2000 | Koide et al. | 349/11 |
| 6,215,532 B1 * | 4/2001 | Takagi et al. | 349/11 |
| 6,239,908 B1 * | 5/2001 | Kelly | 359/480 |
| 6,292,214 B1 * | 9/2001 | Sakano | 348/79 |
| 6,329,965 B1 * | 12/2001 | Lee | 345/8 |
| 6,657,602 B2 * | 12/2003 | Endo et al. | 345/8 |
| 6,795,042 B1 * | 9/2004 | Nagata et al. | 345/8 |
| 6,882,479 B2 * | 4/2005 | Song et al. | 359/630 |
| 6,943,955 B2 * | 9/2005 | Kaschke et al. | 359/630 |

FOREIGN PATENT DOCUMENTS

| | | |
|---|---|---|
| JP | 11084309 A * | 3/1999 |
| SE | 467 278 | 6/1992 |
| WO | WO-01/71407 A1 | 9/2001 |

\* cited by examiner

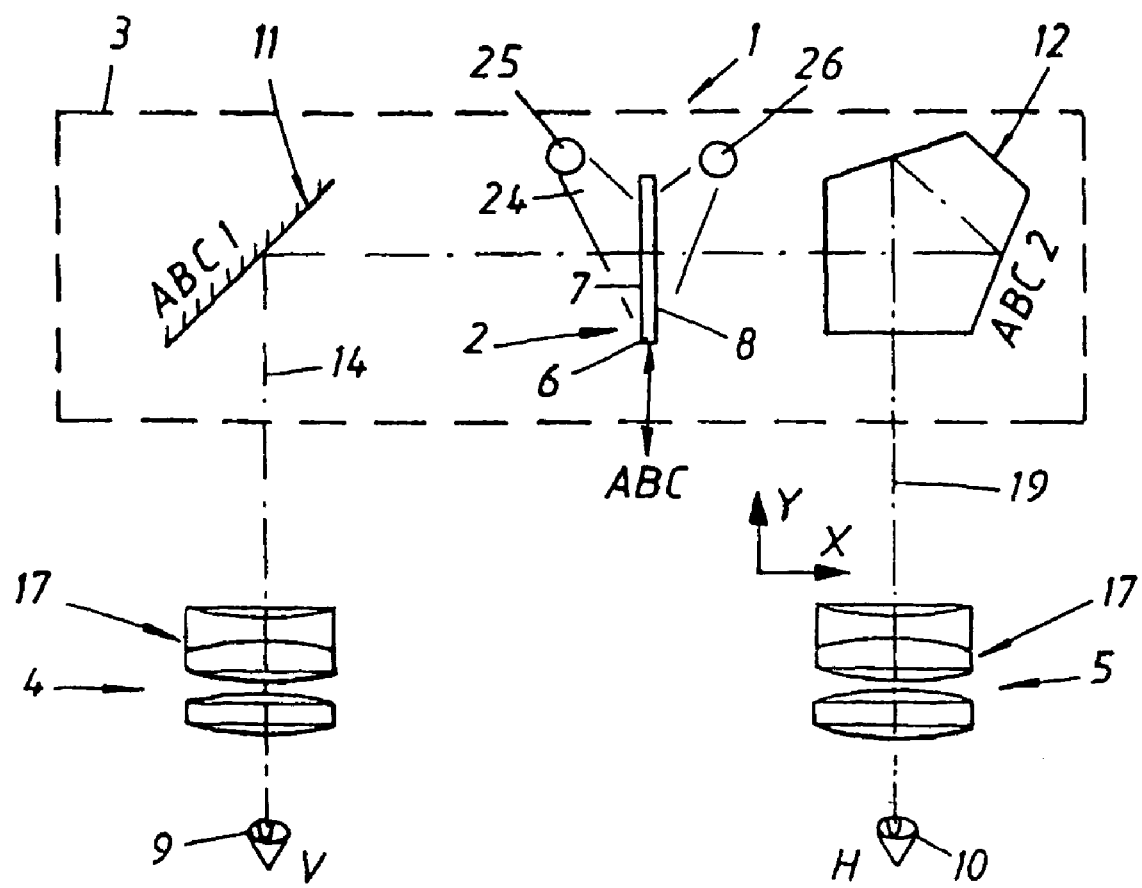

METHOD AND A DEVICE FOR BI-MONOCULAR IMAGE TRANSFER

CROSS-REFERENCE TO RELATED APPLICATIONS

This application is a continuation application under 35 U.S.C. §120 of International Application PCT/SE03/00333, filed on Mar. 3, 2003, and PCT/SE03/00333 claims priority to Swedish application SE0200672-4, filed on Mar. 7, 2002. The entire contents of each of these applications is incorporated herein by reference.

BACKGROUND

This disclosure relates to a method for a viewing arrangement, whereby an image is displayed by an image generator, imaged by an optical imaging system, and transmitted to each eye of a viewer via an eyepiece for each eye.

This disclosure also relates to a viewing arrangement comprising image generator, optical imaging system for imaging an image displayed via the image generator and two eyepieces for viewing the image via an eyepiece for each eye.

The phrase "bi-monocular viewing arrangement" is meant as an arrangement that comprises two eyepieces through which a viewer can focus an image that is common to both eyes. By "image" can be meant here both a "real" image in the form of an object or a landscape, and a "created" image on a display screen. Examples of the former are an optical instrument, for example a telescope, a microscope, etc, where a common image is viewed through two eyepieces via a single lens. Such an optical bi-monocular viewing arrangement is known through, for example, U.S. Pat. No. 4,205,894, which describes a pair of binoculars intended to be worn as a mask in front of the face in order to leave the hands free to carry out other tasks than aiming the binoculars.

A problem associated with this is the bulky relay system of various prisms and lenses which is necessary to turn the image the right way round and transmit the image to each eyepiece, but which results in an unwieldy and heavy pair of binoculars. A plurality of such relay systems is known in various embodiments. In addition, lenses and prisms are made of optical quality glass which is manufactured to a high degree of accuracy in order not to distort the image. This makes the optical components expensive to produce, for which reason it is desirable to be able to manufacture instruments with as few expensive optical components as possible.

Examples of viewing arrangements of the latter type, that is comprising one or more display screens, are for example military image intensifier binoculars, so-called night-binoculars, in which at least one image generator and possibly a computer create graphical illustrations such as movable distance scales or cross hairs via a display screen. The graphical illustration is then transmitted to the viewer's eyes together with a light-intensified image of the object or landscape that is observed optically. Compare, for example, U.S. Pat. No. 5,579,165 or SE-B-467 278, both of which describe viewing arrangements comprising very complicated relay systems for transmitting the images to the eyepieces. In the arrangement that is described in U.S. Pat. No. 5,579,165 the most important optical components are in addition duplicated, as the description is only applicable to one of the two monoculars of the binoculars. In order for both eyes to be able to see the same common image simultaneously, the binoculars must therefore either comprise two image displays, two light sources, etc, or else the binoculars must comprise an extensive relay system similar to that in U.S. Pat. No. 4,205,894, which then further complicates the design and makes it considerably more expensive.

A known example of a relay system of the type described above, that is comprising a plurality of prisms and lenses for turning the image the right way round and transmitting the image to each eyepiece, is the prism system, also called Carl-Zeiss binocular eyepiece system, which is described in the publication Mirror and Prism Systems, pages 13–45, and which comprises four different prisms, $R_1$, $P_1$, $R_2$ and Pk, through which the beams of light from the lens are arranged to pass. $P_1$ consists of a right-angled prism which is attached to the end of a rhombic prism $R_1$. The joint between the two prisms, $R_1$, $P_1$, which joint has a semi-reflective coating (half-mirror layer), divides the beams of light from the lens into two separate pencils of beams, one pencil of beams being transmitted to the left eye while the other pencil of beams is transmitted to the right eye. Before they reach the intended eye, the beams that pass through $A_1$ and $P_1$ first pass through an additional rhombic prism $A_2$. The second pencil of beams passes through a compensating prism Pk that has been added to the system in order to even out the difference in length between the different paths through the prisms for the two pencils of beams. In this way, the aberration is the same for both paths.

The replacement of the four prisms with a light-splitting cubic prism and three reflecting mirrors is also known, in order to reduce the amount of prism glass.

In the case where the distance between the eyepieces needs to be adjusted, for example on account of different interpupillary distances in different users of the viewing arrangement, that is the binoculars, etc, the two eyepieces are rotated around the common central axis through the lens.

One of the problems which forms the basis for the present invention is thus that the currently known designs are not able to show a common image that originates from only one source, such as a single image generator or a single lens, to both eyes simultaneously, without a complicated and expensive relay system that takes up a lot of space also having to be arranged inside the binoculars. It can also be seen that such relay systems increase the weight and result in more parts that can malfunction.

A further problem with such a required design is that the distance between the eyepieces must be able to be adjusted in a simple and functionally-suitable way.

SUMMARY OF THE INVENTION

A main object of this disclosure is to achieve an improved viewing arrangement for transmitting an image to each eye of a viewer via an eyepiece for each eye, which viewing arrangement considerably reduces or completely eliminates the abovementioned problems.

A further object of the present invention is to achieve a method for viewing and transmitting an image that is common to both eyes from a single image generator to each eye of a viewer via an eyepiece for each eye, whereby the favorable characteristics of the image generator for the application with different optical instruments, such as for example night-binoculars, can be utilized in a much better way than was previously the case.

Thus, according to this disclosure, an improved viewing arrangement has been achieved which is characterized in that the image generator has a single two-sided display screen comprising a front and a back for displaying two sides of the same translucent or transparent image, in that the optical imaging system comprises devices for imaging and transmitting the front image to one eye of the viewer via the first eyepiece and the back image to the other eye via the other eyepiece.

A method according to this disclosure may be characterized in that the two sides of the same translucent or transparent image are displayed on the front and back of the image generator's single two-sided display screen, and that devices in the optical imaging system image and transmit the front image to one eye of the viewer via the first eyepiece, and the back image to the other eye via the other eyepiece.

According to further aspects of an arrangement according to an embodiment of the invention, the front and back of the image constitute two simultaneous but mirror images of the same common image. The display screen is either transmissive for imaging the image via transillumination of the screen, or reflective for imaging the image via reflection from the surface of the display screen.

The devices in the imaging system for imaging and transmitting the front image and back image comprise imaging devices and at least one light source for achieving either transillumination or direct illumination of the image generator's display screen depending upon whether this consists of a transmissive or a reflective display screen. The imaging devices include a beam deflector and an image inverter for deflecting and inverting respectively the screen images transmitted from the image generator.

The beam deflector comprises an optical mirror or a prism; the beam deflector comprises a reflective surface, which is preferably arranged at an angle of 45° in relation to the axis of symmetry of one of the eyepieces, for transmission of an image of one side of the display screen, for example its front, to one of the viewer's eyes, for example the left eye.

The image inverter comprises a pentagonal prism which comprises three reflective surfaces, or a suitable number of mirrors or prisms, preferably two, for achieving an inversion and transmission of an image of one side of the display screen, for example its back, to one of the viewer's eyes, for example the right eye.

The light source comprises a point-source lamp or light emitting diode, which is placed within the beam deflector and which is arranged to illuminate the transmissive display screen from inside and through the beam deflector via a condenser lens for dispersion and alignment of the light from the point source.

An embodiment uses a direct illumination of the display screen, which includes a reflective display screen, and the light sources for the direct illumination are arranged so that a reflection of the front and back of the image displayed by the image generator is achieved in a direction towards the respective imaging device.

An embodiment further comprises suitable moving devices for moving the imaging system in the Y-direction in relation to the eyepieces for focusing the image, and also for moving the eyepieces in the X-direction in relation to each other in the case where the interpupillary distance between the eyepieces needs to be adjusted.

The imaging system's two imaging devices may be arranged as two separate units, which are arranged to be movable in relation to each other in the X-direction to make it possible to adjust the interpupillary distance between the eyepieces; the display screen may comprise a liquid crystal display. The image generator may comprise a video or digital generator, and the image generator may comprise a computer. An image displayed via the image generator may comprise an observed and/or created object or landscape.

BRIEF DESCRIPTION OF THE DRAWINGS

Embodiments of the invention will be described in the following with reference to the attached figures in which:

FIG. 5 shows a schematic layout of selected components of a fifth embodiment of the viewing arrangement which comprises a reflective display screen, in contrast to the transmissive display screens above.

DETAILED DESCRIPTION

Figure 1:
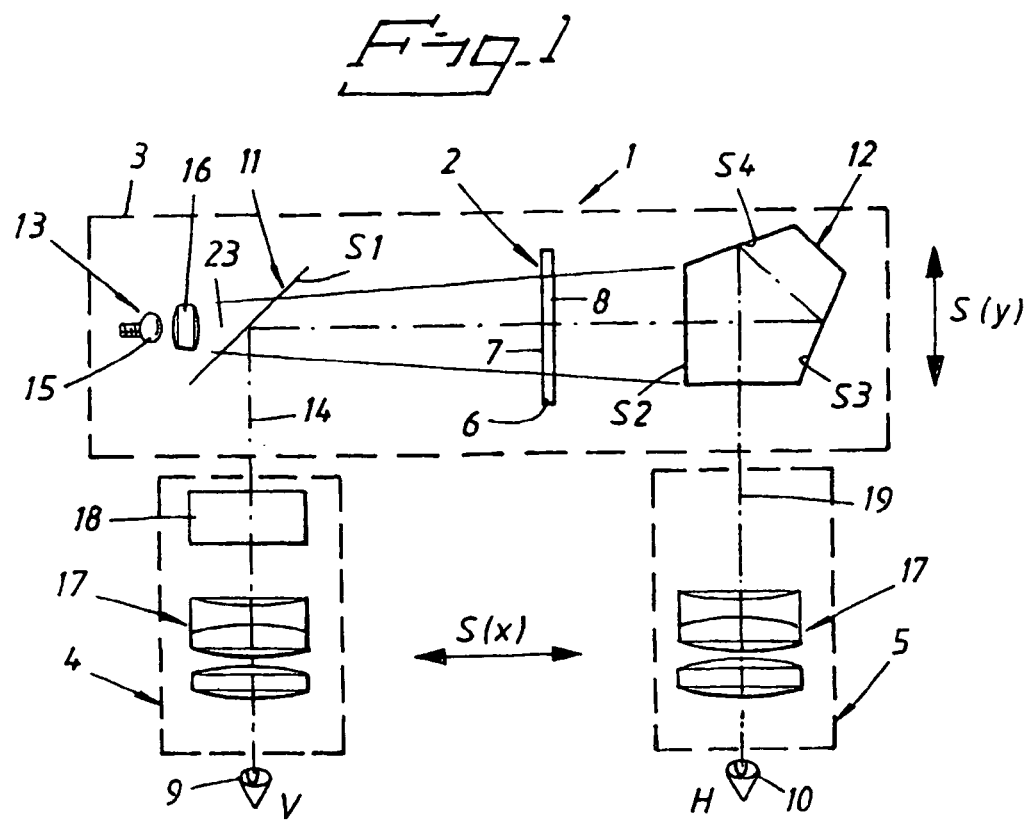
FIG. 1 shows a schematic layout of selected components of a first embodiment of a bi-monocular viewing arrangement which comprises an imaging system which is arranged to be movable in the Y-direction in relation to two eyepieces, which in turn are movable in the X-direction in relation to each other.

With reference to FIG. 1, a layout of selected components of a bi-monocular viewing arrangement 1 according to one embodiment is shown schematically, for use in an optical instrument such as infrared binoculars, which viewing arrangement 1 comprises a single image generator 2 for displaying an image of an observed and/or created Object or landscape ABC, an optical imaging system 3 for imaging and transmitting the image to two eyepieces 4, 5 through which the viewer thus views the image in question ABC which is displayed on the image generator 2. The viewing arrangement 1 comprises, in addition, suitable moving devices (not shown in greater detail) for moving the imaging system 1 in the Y-direction in relation to the eyepieces 4, 5 for focusing the image and also for moving the eyepieces 4, 5, in the X-direction in relation to each other in the case of the interpupillary distance between the eyepieces 4, 5 needing to be adjusted.

The single image generator 2, which, for example, may comprise a video or digital generator, has a display screen 6 comprising a front 7 and a back 8. The display screen 6 can either be transmissively translucent or reflectively transparent, that is the display screen 6 provides an image of the observed object ABC either via transillumination of the screen 6 or via reflection from the surface 7, 8 of the screen. The display screen 6 consists preferably of a so-called Liquid Crystal Display (LCD) which is not described here in greater detail.

In one aspect of an embodiment of the invention, it is important that the image of the observed and/or created object or landscape ABC displayed by the image generator 2, for example via a computer, is transparent or translucent and, in addition, can be projected to the eyepieces 4, 5 to the same extent from both the sides, that is the front 7 and back 8 of the image constitute two simultaneous but mirror images ABC1, ABC2 which, in spite of this, can be made to constitute a common image by means of the imaging system 3 and which image thus appears to be one and the same image ABC and which appears equally bright to both the viewer's eyes 9, 10 via their respective eyepieces 4, 5.

The imaging system 3 comprises two imaging devices 11, 12 in the form of a beam deflector 11 and an image inverter 12 for deflecting and inverting respectively the screen images ABC 1, ABC2 transmitted from the image generator 2 and at least one light source 13 for achieving either transillumination or direct illumination of the image generator's 2 display screen 6 (depending upon whether this consists of a transmissive or a reflective display screen 6). The beam deflector 11 can, for example, comprise a suitable mirror; see FIGS. 1 and 2, or a prism, see FIG. 3.

In the first embodiment shown in FIG. 1, the beam deflector 11 comprises only one optical mirror with a reflective surface S1, which here is arranged at an angle of 45° in relation to the axis of symmetry 14 of the left eyepiece 4, for transmission of an image ABC1 of the front 7 of the display screen 6 to the viewer's left eye 9. The image ABC1 is therefore deflected through a 90.degree. angle to the surface of the display screen 6, tat is the front 7, for which reason this type of beam deflector 11 is also called a 90° mirror below. The image inverter 12 shown includes a pentagonal prism which comprises three reflective surfaces S2, S3, S4, the function of which will be explained in greater detail below. In other embodiments that are not shown, the image inverter 12 can instead comprise a suitable number of mirrors or prisms, preferably two, for achieving an inversion of the image ABC2 transmitted to the eyepiece 5 in question.

The light source 13 is shown in FIGS. 1–4 as a point-source lamp or light emitting diode 15, which is placed within, that is to the left of, the beam deflector 11 and which is arranged to illuminate the display screen 6 from inside and through the 90° mirror 11 via a condenser lens 16 for dispersion and alignment of the light from the point source 13.

The light source 13 can, of course, be arranged or constructed in another suitable way. What is important is that such illumination of the display screen 6 is achieved that a requisite and equally bright projection of its front and back 7, 8 is obtained when focusing the object ABC via the eyepieces 4, 5.

In order to achieve this, the 90° mirror 11 is constructed, for example, by being coated with a special coating on at least one side S1 of the same, in such a way that the light from the light source 13 passes through the mirror 11 in the direction towards the image generator 2 as unimpeded as possible, while as much as possible of the light incident in the opposite direction from the outside S1 of the mirror 11, that is all the light that is arriving from the image generator 2 or that is reflected from the image inverter 12, is deflected via the reflective surface S1 as completely as possible in the direction towards the left eyepiece 4. This will be described in greater detail in the function description. Additional similar or other coatings can of course be applied on other optical surfaces in the viewing arrangement 1, for example the reflective surfaces S2, 33, S4 of the image inverter 12 or on the eyepieces 4, 5, etc, in order to adjust the reflective and transmissive properties of the surface, but also, for example, to improve the image contrast, to reduce glare and to take more light to the eyes 9, 10.

In the image inverter device 12 depicted in the embodiments shown, tat is the pentagonal prism, the first reflective surface S2 in this is constructed wit a semi-reflective coating (half-mirror layer) so that there is 50% reflection of the incident image (the light) ABC2 from the display screen 6 of the image generator 2 back towards the left imaging device's 90° mirror 11, while the remaining 50% of the same image ABC2 passes through the reflective surface S2 for further reflection via the two additional reflective surfaces S3 and S4 to the right eyepiece 10, whereby the incident image ABC2, that is the back's projection 8 of the display screen 6, has now been turned the right way round and thus constitutes a copy of the corresponding image ABC1 transmitted to the retina 9 via the left eyepiece 4.

The eyepieces 4, 5 each comprise a multi-lens eyepiece system 17 to carry out focusing of the incoming images ABC 1, ABC2 from each imaging device 11, 12, so that together they are visible to the eyes 9, 10 as a single common image ABC. In addition, a compensating prism 18 is shown, which here is arranged inside the left eyepiece 4 and which has similar optical properties and is the same thickness as the pentagonal prism 12. The prism 18 is intended to compensate for the differences between the two different beam paths 14 and 19 on each side of the display screen 6. This is necessary as the speed of light through air differs from its speed through a glass prism, that is the speed of light is lower for the left beam path 14 from the front 7 of the image generator 2 than the speed from the back 8 of the image generator 2 through the prism 12 for the right beam path 19. The difference is also dependent upon other differences in propagation length, coatings, optical properties, etc, of the components that make up the two different beam paths. The properties, position, or existence of such a compensating prism 18 is thus determined in such a way that the design in question is made optically symmetrical on each side of the display screen 6.

The abovementioned moving devices for moving the imaging devices 11, 12 of the imaging system 3 and for moving the eyepieces 4, 5 may comprise known technology, and are not described here in greater detail.

Figure 2:
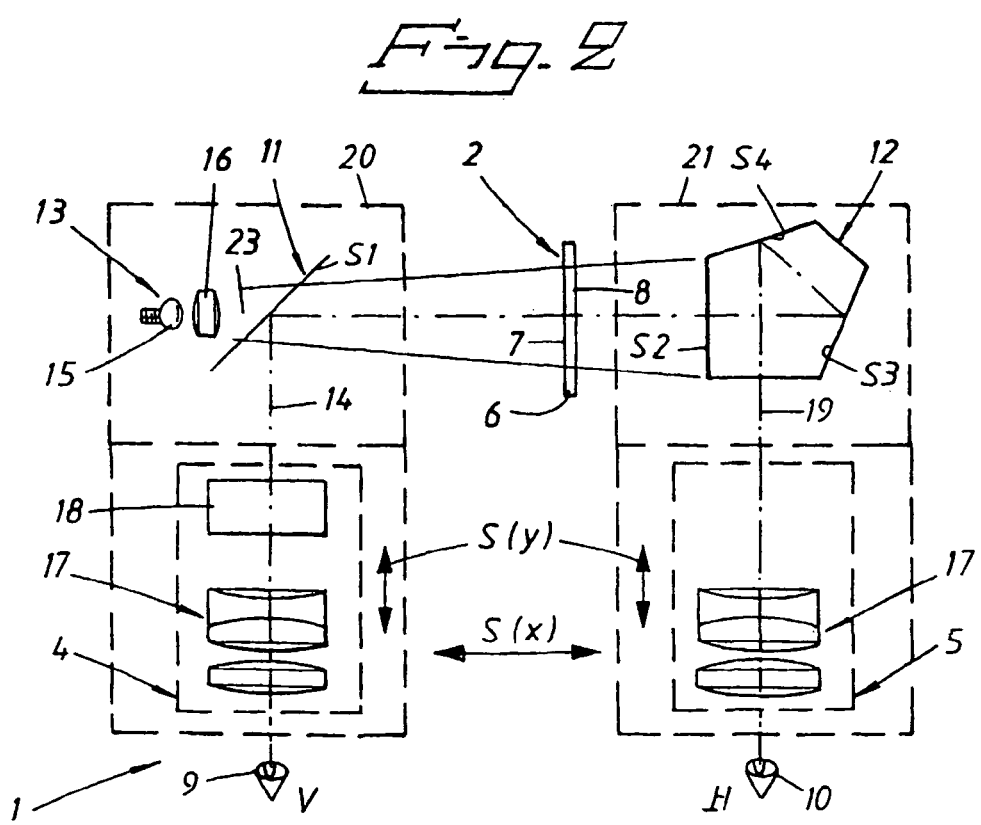
FIG. 2 shows a schematic layout of selected components of a second embodiment of a viewing arrangement in which the imaging system comprises two units which are arranged to be movable in the X-direction together with their respective eyepieces which are movable in the Y-direction.

The second embodiment of the bi-monocular viewing arrangement 1 shown in FIG. 2 differs from the first embodiment in that the imaging system's 3 two imaging devices 11, 12 are arranged as two separate units 20, 21, which are arranged to be movable in relation to each other in the X-direction to make it possible to adjust the interpupillary distance between the eyepieces 4, 5.

In this second embodiment, the imaging units 20, 21 comprise, in addition, their respective eyepieces 4, 5 which are arranged to be movable in the Y-direction in relation to each of the two imaging units 20, 21 in order, by this means, to enable focusing to be carried out. The advantage of this embodiment is that the axes of symmetry and the beam paths 14, 19 between the beam deflector 11 and the image inverter 12 and the eyepieces 4, 5 belonging to these remain unchanged in the X-direction, for which reason the imaging devices 11, 12 can be made smaller than in comparison to the first embodiment without the beam paths 14, 19 missing the mirror 11 and the prism 12 respectively as a result.

Figure 3:
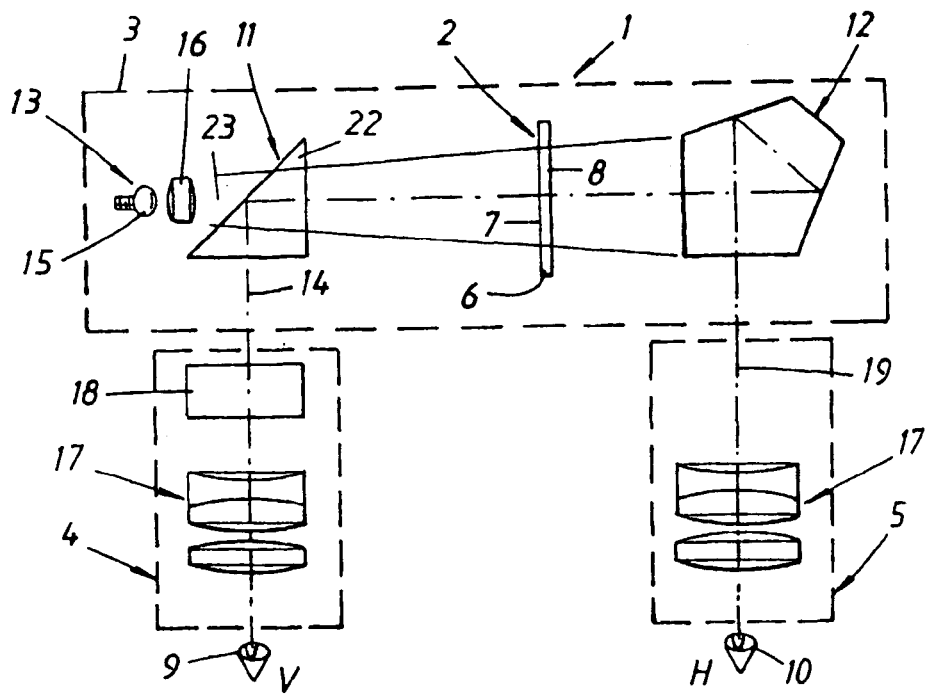
FIG. 3 shows a schematic layout of selected components of a third embodiment of the viewing arrangement which comprises an imaging system with a beam deflector in the form of a right-angled prism, but which otherwise conforms to the first embodiment shown in FIG. 1.

In the third embodiment of the viewing arrangement 1 shown in FIG. 3, this comprises an imaging system 3 with a beam deflector 11 in the form of a right-angled prism 22, but otherwise conforms to the first embodiment shown in FIG. 1. The advantage here is that the design in question can be made optically symmetrical on each side of the display screen 6 in a simpler way, for which reason the compensating prism 18 can be eliminated or can use a smaller prism.

Figure 4:
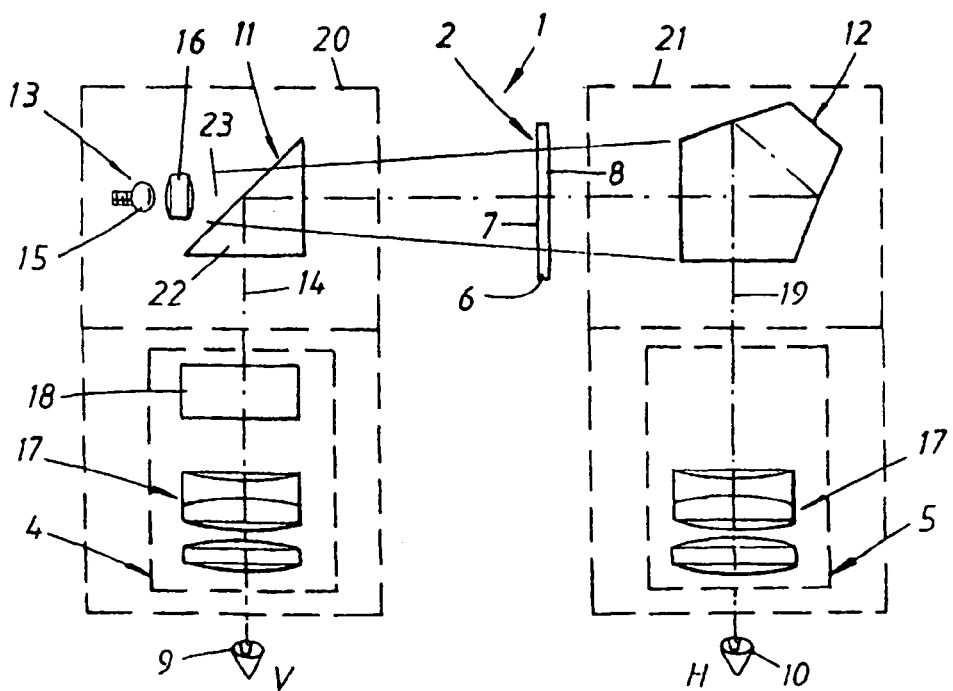
FIG. 4 shows a schematic layout of selected components of a fourth embodiment of the viewing arrangement which comprises a beam deflector in the form of a right-angled prism, but which otherwise conforms to the second embodiment shown in FIG. 2.

The fourth embodiment of the viewing arrangement 1, see FIG. 4, comprises a beam deflector 11 in the form of a right-angled prism 22 in the same way as in the third embodiment, but otherwise conforms to the second embodiment shown in FIG. 2.

Finally, a fifth embodiment of the viewing arrangement 1 is shown in FIG. 5. Unlike the previous embodiments 1–4 comprising a background illumination 23 from a point source 13 and with a transmissively translucent display screen 6, this comprises a direct illumination 24 and a reflectively transparent display screen 6. The light sources 25, 26 of the direct illumination 24 are arranged in such a way that there is a reflection ABC 1, ABC2 of the front and back 7, 8 of the image ABC displayed by the image generator 2 in a direction towards the respective imaging device 11, 12. In other respects, this fifth embodiment conforms to any one of the other embodiments that have been described above.

The function and use of the viewing arrangement 1 according to embodiments of the invention will be described below, with reference to FIGS. 1–4 for the transmissive embodiments shown, and FIG. 5 for the reflective embodiment shown.

An image ABC is reproduced and/or generated on the image generator's 2 translucent transparent display screen 6, for example an LCD display. The reproduction and/or generation is carried out by means of an image reproducing device (not shown), for example a lens, which records a real image and/or an image creating device (not shown), for example a computer, which, by means of suitable graphics, generates a created image with information such as scales, data, etc.

In the embodiments according to FIGS. 1–4, the light source 13, for example a light-emitting diode or a lamp 15, emits a background illumination 23 which, via a condenser lens 16 for alignment of the light, transilluminates the image generator's 2 screen 6 via the beam deflector 11 so that a mirror image ABC2 of the image ABC displayed on the image generator's 2 translucent screen 6 is transmitted to the image inverter 12, here a pentagonal prism. The pentagonal prism's 12 first mirror surface S2 reflects 50% of the illumination back towards the beam deflector 11 while 50% of the illumination passes through the mirror surface S2. This latter light is then transmitted to the eye 10 shown in FIG. 1 via the right eyepiece 5. At the same time, the pentagonal prism turns this mirror image ABC2 into an image ABC that is the right way round so that both eyes 9, 10 see the "same" image ABC simultaneously, in spite of the fact that the left eye 9 actually sees the front 7 and the right eye 10 sees the back 8 of the original translucent image ABC on the display screen 6.

The coating S1 on the beam deflector 11 means that the light from the light source 13 is allowed to pass through in the direction towards the image generator 2, while essentially all light that comes from the opposite side of the beam deflector 11 (in the direction from the image inverter 12) is reflected towards the first eyepiece, that is the left eyepiece 4 shown in FIG. 1. The reflection is carried out for this purpose at a particular angle to the angle of incidence of the incoming light, 90° in the above, for which reason the beam deflector 11 in FIG. 1 and FIG. 2 is also called a 90° mirror.

In the embodiments shown in FIGS. 3 and 4, the transillumination of the display 2 is carried out instead via the right-angled prism 22, which here comprises the beam deflector 11. The transmission of the image ABC displayed on the image generator's 2 screen 6 to the viewer's eyes 9, 10, is carried out from that point in the same way as for the first and second embodiments of the viewing arrangement 1.

In the embodiment which is shown in FIG. 5, the point-source light 13 and the transmissive display screen 6 according to the previous embodiments 1–4 have been replaced by a direct illumination 24 of a reflective but still transparent display screen 6. By this means, a reflection ABC1, ABC2 is achieved of the front and back 7, 8 of the image ABC displayed by the image generator 2. The light sources 25, 26 of the direct illumination 24 are positioned in such a way that the reflected light from the image generator 2 meets each imaging device 11, 12 in such a way that each image ABC 1, ABC2 is transmitted to the respective eyepiece 4, 5. Otherwise, this fifth embodiment conforms with any one of the other abovementioned embodiments with regard to alternative imaging devices 11, 12 and moving devices (not shown), including the function of these.

The function and use of the viewing arrangement's 1 moving devices according to the first and the third embodiments of the invention, see FIG. 1 and FIG. 3, are schematically as follows:

If the interpupillary distance between the left 9 and the right eye 10 (that is in the X-direction) needs to be adjusted by a particular distance S(x), the imaging system 3 is moved as a unit in the Y-direction a distance S(y) which corresponds to half this increase or decrease in distance between the eyepieces, 4, 5, that is S(x)=2S(y), whereby the beam paths 14, 19 remain the same.

When adjusting the interpupillary distance according to the second and fourth embodiments of the invention, see FIG. 2 and FIG. 4, which comprise two separate imaging units 20, 21, this is carried out schematically as follows:

When the right and left imaging units 20, 21 are moved apart by the distance +S(x) or moved together by the distance −S(x), the respective eyepieces 4, 5 are moved a corresponding distance in the Y-direction, that is +S(x)=−S(y), whereby focusing is carried out.

The invention is not limited to the embodiments shown but can be varied in different ways within the framework of the patent claims. It is recognized, for example, that in the embodiments of the imaging system 3 shown in particular in the figures, the left imaging device 11 comprises a beam deflector, while the right consists of an image inverter 12. In other embodiments that are not shown, it is, of course, quite possible to have these be arranged in the opposite way.

It is further recognized that the number, size, material and shape of the elements and components comprised in the viewing arrangement 1, for example the lenses and prisms, can be changed to suit the special circumstances that apply for the embodiment in question or for its application in a particular optical instrument.

The invention is thus not limited in any way to the embodiments shown in particular, but every other configuration of the design elements according to the above falls within the concept of the invention.

It is also to be noted that the terms transparent and translucent have been used in the sense that the display screen is either transmissively translucent or reflectively transparent when the image displayed on the display screen consists of the same image which can always be viewed from both sides of the screen simultaneously. One side of the image, for example the front, is thereby always a mirror image in relation to the opposite side, here the back, preferably by the display screen comprising a translucent or transparent LCD display. Arranging two screens, for example back to back, showing the same image does not give such a mirror image of the sides of the image or of the transparent or translucent display screen.

The invention claimed is:

1. A viewing arrangement, comprising:
   an image generator comprising a single, two-sided display screen having a front and a back side which display a front image and a back image, respectively, of a translucent or transparent image generated by the image generator;
   first and second eyepieces suitable for viewing the front and back images via respective eyes of a person using the arrangement;
   an image inverter;
   a compensating prism in an optical path including the first eyepiece;
   an optical imaging system which images and transmits the front image to one eye of the person using the arrangement via the first eyepiece, and the back image to another eye of the person using the arrangement via the second eyepiece,
   wherein the back image is transmitted through the image inverter and inverted before being transmitted through the second eyepiece, and
   wherein the front image is transmitted through the compensating prism before being transmitted through the first eyepiece.

2. The viewing arrangement of claim 1, wherein the front and back images corresponding to the image comprise two simultaneous mirror images of the translucent or transparent image.

3. The viewing arrangement of claim 1, wherein the two-sided display screen is transmissive for imaging the image via transillumination of the screen.

4. The viewing arrangement of claim 1, wherein the two-sided display screen is reflective for imaging the image via reflection from a surface of the display screen.

5. The viewing arrangement of claim 1, wherein the optical imaging system comprises imaging devices and at least one light source suitably arranged to enable either transillumination or direct illumination of the two-sided display screen.

6. The viewing arrangement of claim 5, wherein the imaging devices comprise a beam deflector that deflects the front image generated by the image generator.

7. The viewing arrangement of claim 6, wherein the beam deflector comprises an optical mirror or a prism having a reflective surface arranged at an angle of about 45° with respect to an axis of symmetry of one of the first and second eyepieces,
   wherein the beam deflector transmits an image of one side of the two-sided display screen to one of the first and second eyepieces.

8. The viewing arrangement of claim 6, wherein the image inverter comprises a prism.

9. The viewing arrangement of claim 8, wherein the means for inverting and transmitting comprises two mirrors or prisms.

10. The viewing arrangement of claim 6, wherein the at least one light source comprises a point-source lamp or light emitting diode arranged to the beam deflector, and wherein the two-sided display screen is transmissive,
   the point source being arranged to illuminate the transmissive two-sided display screen from inside and through the beam deflector via a condenser lens which disperses and aligns the light from the point source.

11. The viewing arrangement of claim 6, wherein the at least one light source comprises two point-source lamps or light emitting diodes arranged so as to each directly illuminate a respective side of the two-sided display screen,
   the two-sided display screen comprising a reflective display screen, wherein the two point-source lamps or light emitting diodes are arranged so that a reflection of the front image and back image displayed by the image generator is achieved in a direction towards the a corresponding one of the imaging devices.

12. The viewing arrangement of claim 5, wherein the imaging devices comprise two imaging devices arranged as two separate units which are movable in relation to each other in an X-direction to enable adjustment of an interpupillary distance between the first and second eyepieces.

13. The viewing arrangement of claim 1, wherein the image inverter comprises a pentagonal prism having at least three reflective surfaces thereon.

14. The viewing arrangement of claim 1, further comprising moving devices which move the optical imaging system in a Y-direction in relation to the first and second eyepieces so as to focus the image, and which also move the first and second eyepieces in an X-direction to adjust an interpupillary distance between the first and second eyepieces.

15. The viewing arrangement of claim 1, wherein the two-sided display screen comprises a liquid crystal display.

16. The viewing arrangement of claim 1, wherein the image generator comprises a video or digital generator.

17. The viewing arrangement of claim 1, wherein the image generator comprises a computer.

18. The viewing arrangement of claim 1, wherein the image generated by the image generator comprises an observed and/or created object or landscape.

19. A method for viewing an image, the method comprising:
   generating an image;
   processing the generated image with an optical imaging system into front and back images;
   displaying the front and back images on a single, two-sided display; inverting the back image;
   compensating for a path length difference between the front image and the back image by passing the front image through a prism; and
   simultaneously transmitting each of the compensated front image and inverted back image to respective first and second eyepieces which are suitable for use by a person viewing the front and inverted back images.

* * * * *